United States Patent [19]

Ogata et al.

[11] Patent Number: 4,983,976
[45] Date of Patent: Jan. 8, 1991

[54] SIGNAL TRANSMISSION SYSTEM AND METHOD

[75] Inventors: Akimitsu Ogata, Takatsuki; Hisato Fujisaka, Izumi; Sadao Igarashi, Kamifukuoka; Toshimitsu Nozu, Hino; Katsura Onozato, Tokyo; Masanobu Hirose, Fuchu; Katsuji Miwa, Souka, all of Japan

[73] Assignee: Omron Tateisi Electronics Co., Kyoto, Japan

[21] Appl. No.: 364,326

[22] Filed: Jun. 12, 1989

[30] Foreign Application Priority Data

Jun. 17, 1988 [JP] Japan .................. 63-148165
Oct. 27, 1988 [JP] Japan .................. 63-269571

[51] Int. Cl.$^5$ ............................ G08G 1/01
[52] U.S. Cl. ........................ 342/42; 342/44
[58] Field of Search ............... 342/42, 44, 50

[56] References Cited

U.S. PATENT DOCUMENTS

| | | | |
|---|---|---|---|
| 4,242,663 | 12/1980 | Slobodin | 342/ |
| 4,278,977 | 7/1981 | Nossen | 342/ |
| 4,364,043 | 12/1982 | Cole et al. | 342/ |
| 4,641,374 | 2/1987 | Oyama | 342/51 X |

FOREIGN PATENT DOCUMENTS

| | | | |
|---|---|---|---|
| 0026195 | 2/1977 | Japan | 342/42 |
| 60-27077 | 6/1985 | Japan | |
| 1507050 | 4/1978 | United Kingdom | 342/42 |
| 1515666 | 6/1978 | United Kingdom | 342/42 |

Primary Examiner—Thomas H. Tarcza
Assistant Examiner—Mark Hellner
Attorney, Agent, or Firm—Dickstein, Shapiro & Morin

[57] ABSTRACT

A data transmission system includes a data carrier which has a memory for storing therein data including an identification code and which is attached to an object and a main apparatus having a microwave oscillator so as to conduct communications with the data carrier by use of a microwave, thereby writing data in or reading data from the memory of the data carrier.

The main apparatus transmits a microwave modulated by a command or data and thereafter transmits a nonmodulated carrier for a predetermined period of time. On receiving a command, the data carrier executes a read/write operation on the memory and then generates a response. The data carrier receives the nonmodulated carrier sent from the main apparatus so as to conduct a modulation of quadrature phase-shift keying thereon by use of response data, thereby reflectively transmitting the modulated carrier with a plane of polarization shifted from a plane of polarization of the received wave by 90°.

19 Claims, 7 Drawing Sheets

SIGNAL TRANSMISSION SYSTEM AND METHOD

BACKGROUND OF THE INVENTION

1. Field of the Invention

The present invention relates to a signal transmission system and a signal transmission method in the system including a data carrier having a memory for storing therein particular data having an identification code, said data carrier being attached to an object such as a moving object, and a main apparatus for effecting a communication with the data carrier by use of a microwave so as to write data in or read data from the memory of the data carrier.

2. Description of the Prior Art

In a manufacturing process of various kinds of products, a data carrier is attached to a piece of work or a work piece or to a carrying plate (such as a pallet) of a workpiece transported on a belt conveyor. The memory of the data carrier is used to store therein an identification code of an object (a workpiece or a carrying plate) onto which the data carrier is to be attached, a job procedure of each process, a job data, and the like. One or more main apparatuses (control apparatuses) are arranged along the conveyor line. When a moving object passes a range where the main apparatus can conduct communications with the data carrier, the main apparatus writes data in or read data from the memory of the data carrier attached to the object.

As an application example of this kind of system, there has been known a system in which a data carrier is installed on an automobile. There is arranged a control apparatus at a predetermined position to transmit a microwave carrier signal. The data carrier receives the carrier signal by means of an antenna so as to modulate the signal depending on data read from the memory and then emits the obtained signal as a reflection wave from the same antenna. The control apparatus receives the reflection wave so as to demodulate the wave, thereby detecting the data.

As an example of the conventional modulation method in a data carrier, there has been known a modulation method described in the Japanese Patent Publication (Kokoku) No. 60-27077. In this method, the data carrier is provided with a reflective phase modulator, which is used to shift the frequency of the received microwave carrier so as to produce a sideband wave of the carrier such that the sideband wave is modulated by use of data to be transmitted, thereby transmitting the modulated wave as a reflection wave. The control apparatus transmitting the carrier receives only the sideband wave so as to effect a demodulation on the sideband wave to attain the data.

However, in a case where a metal object exists in the proximity of the data carrier, a reflection wave from the metal object overlaps with the reflection wave from the data carrier and hence the signal-to-noise (S/N) ratio is deteriorated, which leads to a problem that a correct data transmission cannot be effected. In addition, in a case where the frequency of the sideband wave is in the neighborhood of the carrier frequency, if the system includes a filter circuit not having a sufficient frequency selecting capability, the signal-to-noise ratio is also deteriorated and hence an error is likely to take place.

On the other hand, there has been employed a system in which a main apparatus sends carriers associated with a horizontally polarized wave and with a vertically polarized wave such that a circular polarized microwave associated with a rotation in a direction is supplied to a data carrier, which then sends as a reflection wave a cicular polarized microwave associated with a rotation in a reverse direction. With this provision, it is possible to discriminate the reflection wave of the metal object from that reflected from the data carrier. However, this method is attended with a problem that the antenna system becomes to be complicated.

SUMMARY OF THE INVENTION

It is therefore an object of the present invention to provide a system in which an appropriate data transmission can be achieved without any adverse influence caused by a reflection wave from a metal object.

Another object of the present invention is to provide a system in which a plurality of main apparatuses are arranged so as to be separated with a relatively short distance therebetween such that even when frequencies of microwave carriers emitted from these main apparatuses are identical to each other or are quite similar to each other, there can be prevented a radio interference from taking place therebetween.

Further another object of the present invention is to simplify the structure of an antenna so as to minimize the size of a data carrier.

A signal transmission system according to the present invention includes a data carrier which has a memory for storing therein data inlcuding an identification code and which is attached to an object and a main apparatus having a microwave oscillator so as to communicate with the data carrier by use of a microwave, thereby writing data in or reading data from the memory of the data carrier. The main apparatus comprises first transmit means for modulating the microwave according to a command or data to be sent to the data carrier and thereafter to transmit non-modulated microwave carrier for a predetermined period of time and first receive means for receiving and for modulating a microwave returned from the data carrier so as to obtain data therefrom. The data carrier includes second receive means for receiving and for modulating a microwave sent from the main apparatus so as to obtain a command or data therefrom, control means for executing read/write operations on the memory, and second transmit means for returning to the main apparatus response data indicating a memory read/write operation thus executed. The second transmit means of the data carrier includes antenna means for receiving the non-modulated microwave carrier so as to reflectively transmit a modulated microwave and modulate means for changing a reflection coefficient of the microwave in the antenna means into four levels or phases in a sense of a vector depending on response data to be transmitted, thereby effecting a quadrature phase-shift keying (QPSK) on the received microwave carrier.

According to the present invention, the non-modulated microwave carrier sent from the main apparatus is subjected, in the data carrier, to a quadrature phase-shift keying depending on data to be transmitted to the main apparatus, thereby returning the obtained wave to the main apparatus. Since the system adopts the quadrature phase-shift keying, in a phase demodulation on the main apparatus side, the phase difference between the received signal and a reference signal can be correctly tranformed into an amplitude regardless of the distance between the main apparatus and the data carrier, which enables an appropriate data demodulation to be accomplished in any situation.

In addition, in the signal transmission system according to the present invention, the second transmit means of the data carrier includes antenna means for receiving the non-modulated microwave carrier so as to reflectively transmit a modulated microwave, oscillate means for producing a subcarrier, first modulate means for modulating the subcarrier generated from oscillate means by use of response data to be transmitted, and second modulte means for changing a reflection coefficient of the microwave in the antenna means dependin on a signal outputted from the first modulate means so as to modulate the received microwave carrier.

According to the present invention, the data carrier includes oscillate means for producing a subcarrier, which is modulated in the data carrier depending on data to be sent to the main apparatus. Furthermore, by use of the subcarrier thus modulated, the non-modulated microwave carrier sent from the main apparatus is modulated. On the other hand, the main apparatus receives the microwave which has undergone the modulation in a duplicated manner and which is returned from the data carrier so as to extract one of sideband waves having central frequencies apart from the carrier frequency by a distance equivalent to the subcarrier frequency in the higher and lower frequency directions. The sideband wave has a frequency which is apart from the carrier frequency by the subcarrier frequency. Since the subcarrier frequency can be set to a relatively high value (for example, 10 MHz), a frequency discrimination of the received signal can be easily achieved in the demodulate processing on the main apparatus side. Even in a case where a plurality of main apparatuses are located in the vicinity of each other and the frequencies of the carriers employed in these apparatuses are identical or is quite similar to each other, since the sideband wave is extracted by each of the main apparatuses as described above, there does not occur any problem such as a radio interference even if the carrier of another main apparatus is received. Moreover, also in a case where a reflection wave (carrier frequency) from a metal object of the like located in the environment is superimposed onto the received signal, the reflective wave does not adversely affect the operation. The appropriate data communication is accordingly effected.

In the signal transmission system according to the present invention, the main apparatus inlcudes first means for modulating a microwave by use of a command or data to be sent to a data carrier and first receive means for receiving and for demodulating a microwave returned from the data carrier so as to obtain data therefrom; whereas the data carrier comprises second receive means for receiving and for demodulating a microwave sent from the main aparatus so as to obtain a command or data therefrom, control means for effecting a memory read/write operation in response to the received command, and second transmit means for returning to the main apparatus response data related to the read/write operation thus executed.

Furthermore, the first transmit means and the first receive means are provide with a transmit/receive antenna shared therebetween such that the antenna is configured to transmit a microwave and to receive a microwave having a plane of polarization which is different from a plane of polarization of the transmitted microwave by 90°.

The second transmit means of the data carrier includes a reflective antenna constructed to transmit a microwave having a plane of polarization which is different from a plane of polarization of the received microwave by 90°.

According to the present invention, when a non-modulated microwave carrier transmitted from the main apparatus and then received by the data carrier is modulated by the data carrier to emit the obtained wave from the reflective antenna to the main apparatus, the plane of polarization of the transmission microwave is set to be different from that of the received microwve carrier by 90°. The antenna of the main apparatus is also configured to receive a microwave having a plane of polarization which is different from a plane of polarization of the transmitted microwave by 90°. In consequence, the main apparatus can obtain data from the received signal with a high sigal-to-noise ratio without any adverse influence from a reflective wave caused by a metal object in the neighborhood of the data carrier. In addition, the antenna is also configured in a simple fashion and hence the size of the data carrier is minimized.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

In the following embodiments, the system includes a data carrier attached to a moving object and a main apparatus fixedly located at a predetermined position. When the object passes a position before the main apparatus, the main apparatus reads data from or writes data in a memory of the data carrier. This system is applied to the processing to count or to manage vehicles running through roads.

Conversely, the main apparatus may be mounted on a moving object such as a vehicle. In this case, a plurality of data carriers are arranged along a moving path of the moving object such as a road. As the vehicle moves, the main apparatus sequentially reads data from the data carrier. In any cases, the signal transmission system according to the present invention is suitable applied to a case where the relative positions of the data carrier and the main apparatus are changed.

Figure 1:
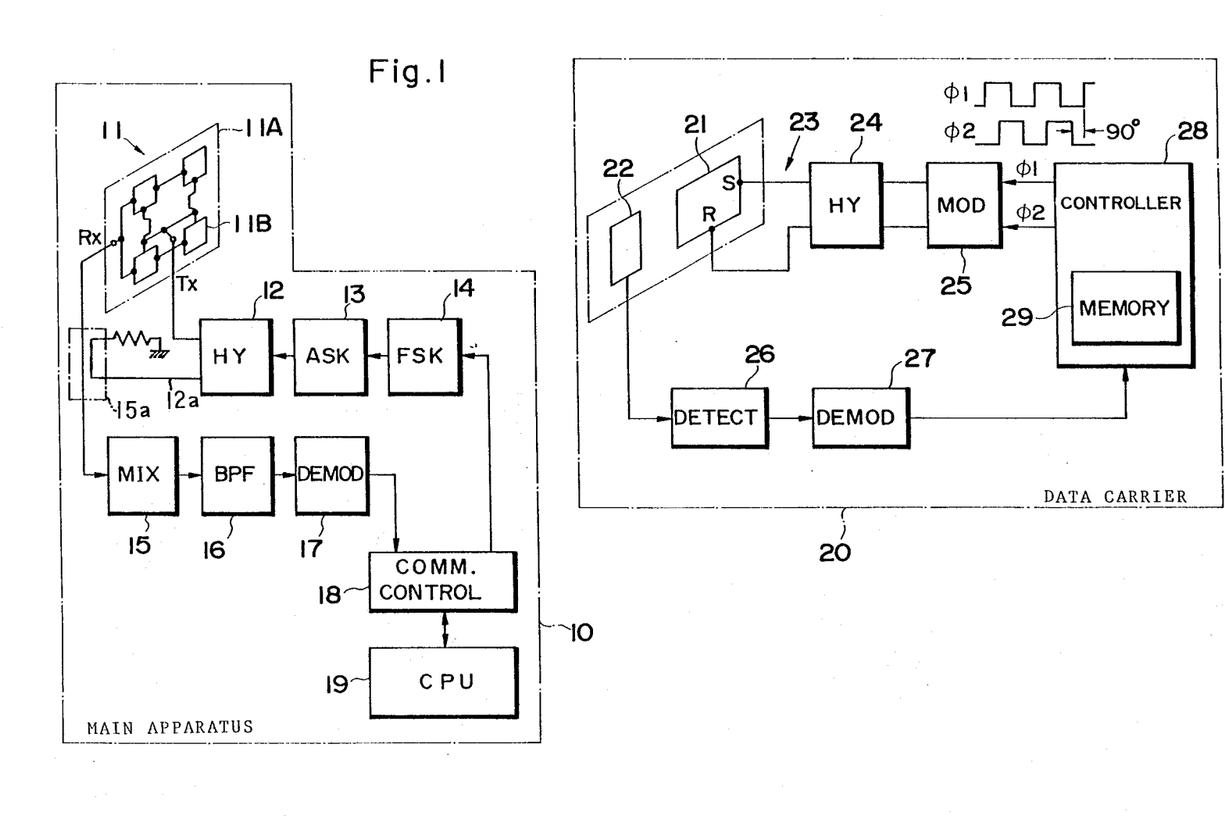
FIG. 1 is a block diagram schematically showing an electric configuration of a signal transmission system including a main apparatus and a data carrier as an embodiment according to the present invention.

The configuration of FIG. 1 inlcudes a main apparatus 10 comprising a transmit section, a receive section and an antenna 11 shared among the transmit/receive sections to effect communications with a data carrier 20, a communication control section 18 for controlling the transmit/receive sections, and a central processing unit (CPU) 19 for controlling the communication control section 18 so as to supervise operations to read data from and to write data in a memory 29, which will be described later.

The transmit section of the main apparatus 10 includes a frequency-shift keying (FSK) circuit 14, an amplitude-shift keying (ASK) circuit 13, and a hybird coupler 12. Data to be sent to the data carrier 20 is encoded by the communication control section 18 according to the non-return-to-zero (NRZ) format. The FSK cirucit 14 receives the NRZ signals from the CPU 19 by use of the communication control section 18 so as to establish correspondences, for example, between "1" of the NRZ signals and 50 kHz of the modulated signals and between "0" and 30 kHz such that an FSK operation is conducted by the NRZ signals, thereby supplying the ASK circuit 13 with the modulated signals. The ASK circuit 13 includes an oscillator generating a microwave carrier of a frequency of 2.45 GHz such that the oscillate operation of or the oscilation output from the microwave oscillator is repeatedly turned on and off depending on the input signal to undergo the ASK modulation, thereby producing a microwave undergone the ASK modulation. The microwave thus undergone the FSK and ASK modulations is fed via the hybird coupler 12 to a transmission terminal Tx of the antenna 11 so as to be emitted therefrom.

The transmit section of the main apparatus 10 has a function, in addition to the function above to transmit a microwave modulated depending on a command or data to be transmitted, to transmit a non-modulated microwave carrier of 2.45 GHz. This function is achieved by continuously effecting the oscillation in the microwave oscillator of the ASK circuit 13. The microwave carrier generated from the ASK circuit 13 is delivered via the hybird coupler 12 to the transmission terminal Tx of the antenna 11 so as to be emitted therefrom.

As will be described later, after the transmission of the microwave modulated depending on a command or data to be transmitted to the data carrier 20, the main apparatus 10 sends a nonmodulated microwave carrier for a predetermined period of time. If the data carrier 20 is within a range where the communication is possible with the main apparatus 10, the data carrier 20 conducts a quadrature phase-shift keying (QPSK) on the nonmodulated microwave carrier depending on response data (which is also encoded in the NRZ format, for example) so as to return the result as a reflection wave. The reflection microwave is received by the antenna 11.

The receive section of the main apparatus 10 includes a mixer 15 for receiving via a reception terminal Rx a microwave received by the antenna 11. There is a hybird coupler 15a for coupling the received microwave and an output portion 12a of the microwave carrier from the hybird coupler 12 of the transmit section and for feeding the coupled signal to the mixer 15 such that a component of a differential frequency assoiciated with the transmitted microwave and the received microwaves is extracted by the mixer 15 (homodyne sychronization detection). The mixer 15 produces an output signal, which is fed to a bandpass (or low-pass) filter 16 so as to remove the carrier component, so that a signal associated with a frequency component of a frequency range from 30 kHz to 50 kHz (frequency components of signals Φ1 and Φ2 which will be described later) passes through the filter 16. The filter 16 delivers an output to the phase demodulator circuit 17, thereby finally demodulating the NRZ signal. The attained NRZ signal is converted by the communication control unit 18 into data of a predetermined format and is then supplied to the CPU 19. Through the operations above, the main apparatus 10 can obtain data from the data carrier 20.

The hybird coupler 12, the ASK circuit 13, and the mixer 15 constitute a microwave circuit by means of a microstrip line.

The microwave transmitted from the main apparatus 10 is received by the data carrier 20 and thereafter the polarization plane thereof is rotated by 90° such that the resultant wave is reflectively emitted from the data carreir 20, which will be described later. In consequence, there exists a shift of 90° in the polarization plane between the transmission microwave and the reception microwave in the main apparatus 10, and the antenna 11 is configured to receive a microwave having a plane of polarization which is shifted by 90° from the polarization plane of the transmission microwave.

Figure 2:
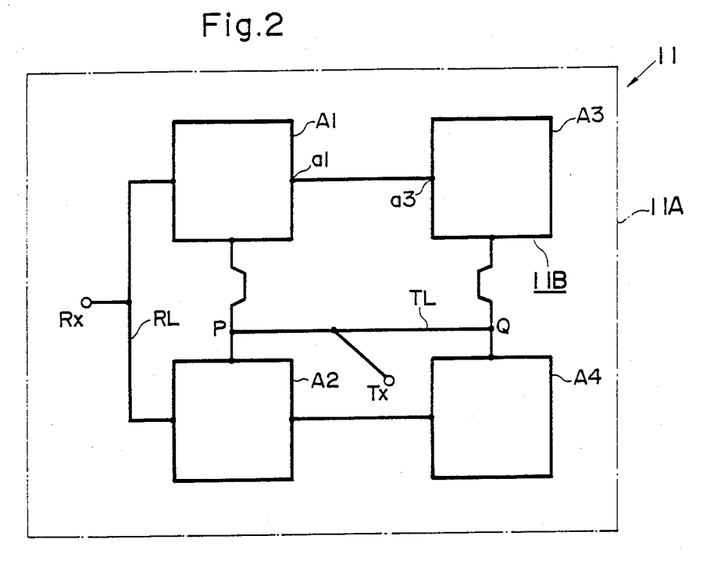
FIG. 2 is a plan view showing a pattern of a transmit/receive antenna in the main apparatus.

FIG. 2 shows in detail the constitution of the anetenna 11 of the main apparatus 10. The antenna 11 is a microstrip antenna including a conductor pattern 11B formed on a board 11A and has an advantage that the size thereof can be reduced. The antenna 11 is a transmit/receive antenna including four square and planar antennas (square patterns) A1 to A4. That is, the square antennas A1 to A4 are respectively connected to each other by use of lines (conductor patterns). There is disposed a line TL connecting a point P on a line between the antenna A1 and A2 and a point Q on a line between the antennas A3 and A4 such that the line TL is linked to the transmission terminal Tx. On the other hand, there is provided a line RL between the antenna A1 and the antenna A2 such that the line RL is connected to the receive terminal Rx. The phase distance between the antennas A1 and A3 (the distance between the points a1 and a3) and between antennas A2 and A4 are respectively set to λ/2 (λ is a wavelength of the microwave). The point Q is also arranged in the system design such that the difference between the phase distances between the point P and the antenna A1 and between the point P and the antenna A2 is set to λ/2. The terminal Tx is driven by a transmission signal and a reception signal is obtained from the terminal Rx. In this antenna 11, it is possible to set the polarization plane of the transmission wave to be shifted from that of the reception wave by 90°, thereby simultaneously conducting the signal transmission and the signal reception without causing a radio interface therebetween.

The data carrier 20 includes a reflective receive/transmit antenna 21 and a receive antenna 22 for communicating with the main apparatus 10, a transmit section for effecting the QPSK operation on the carrier received by the antenna 21 by use of response data to be sent to the main aparatus 10 so as to reflectively return the microwave undergone the QPSK operation to the antenna 21, a receive section for demodulating the microwave received by the antenna 22, a memory 29, and a controller 28 for writing data in or for reading data from the memory 29 depending on a command from the main apparatus 10 received by the receive section and for controlling the transmit section to send response data representing the reasult of the read or write operation to the main apparatus 10.

The antennas 21 and 22 are microstrip antennas each including a conductor pattern formed on a board. The antenna 21 has a square shape in which a transmission terminal S and a reception terminal R are respectively disposed on two orthogonal sides of the square. With this provision, it is possible to transmit a microwave (reflection wave) with a plane of polarization which is different from the polarization plane of the received microwave by 90°. The antenna 22 also has a rectangular shape and receives a microwave transmitted from the main apparatus 10. The antennas 21 and 22 need not necessarily be microstrip antennas; moreover, both antennas need not be formed in the same plane. As shown in this embodiment, by configuring two antennas 21 and 22 in a microstrip structure on one board, the antenna structure becomes to be simplified and hence the size thereof can be reduced.

On receiving the microwave undergoine the FSK and ASK operations by use of a command or data and transmitted from the main apparatus 10, the antenna 22 supplies the received signal to a detection cirucit 26. The detection cirucit 26 is a diode detecting circuit to conduct an amplitude demodulation of an input signal and produces an output signal to be supplied to a frequency demodulation circuit 27. The frequency demodulation circuit 27 includes a digital phase locked loop (PLL) to convert an input signal into an NRZ signal. The demodulated NRZ signal is supplied to a controller 28.

The controller 28 inlcudes a memory 29 in which an identification code of the data carrier 20 or of an object to which the data carrier 20 is attached, data related to the object, instructions of work processes for the object, and other data are beforehand stored or these data items are written therein by the main apparatus 10.

As described above, after the transmission of the microwave modulated by use of the command or data to be sent to the data carrier 20, the main apparatus 10 sends a nonmodulated microwvve carrier for a predetermined period of time. When the carrier 20 receives a command from the main apparatus by use of the receive section thereof, the controller 28 conducts processing associated with the command. For example, the controller 28 reads an indentification code and other data from the memory 29 or write in the memory 29 data supplied from the main apparatus 10 (update of the data). When the processing is completely effected depending on the command, the controller 28 sends an indication of the completion of the processing and data (specifically, the data read from the memory) to the main apparatus 10. For the transmission of the response, the transmit section of the data carrier 20 achieves operations.

After the command transmission has been conducted, the antenna 21 receives a nonmodulated microwave carrier signal transmitted from the main apparatus 10. The received carrier signal is fed via the hybrid coupler 24 to the modulator circuit 25. On the other hand, the controller 28 outputs two signals $\Phi 1$ and $\Phi 2$ to represent response data and supplies the signals to the modulator circuit 25. Each of the two signals $\Phi 1$ and $\Phi 2$ is a square pulse signal having a duty of $\frac{1}{2}$ and there exists a phase difference of 90° between these signals. When the NRZ signal representing the response data to be transmitted is "1" or "0", both of the frequencies of these signals $\Phi 1$ and $\Phi 2$ are changed, for example, to 50 kHz or 30 kHz, simultaneously. In the modulator circuit 25, due to a rotary change in the reflection coefficient associated with the signals $\Phi 1$ and $\Phi 2$, the phase of the inputted carrier signal also undergoes a rotary change and a reflection. The phase rotary speed is changed to 30 kHz or 50 kHz depending on the response data. The reflection wave thus undergone the phase modulation is fed via the hybrid coupler 24 to the transmission terminal S of the antenna 21 so as to be emitted as a modulated microwave therefrom.

In the antenna 11 of the main apparatus 10, there exists a difference of 90° between the polarization planes respectivly of the transmission and reception microwaves. In consequence, even in a case where a metal object is present in the proximity of the data carrier 20 and the microwave sent from the main apparatus 10 is reflected on the metal object such that the reflection wave is superimposed on a microwave received by the main apparatus 10, the reflection wave is rarely received by the antenna 11 and hence the signal-to-noise ratio of the reception signal is not deteriorated.

The microwave transmitted from the antenna 11 of the main apparatus 10 is required to be simultaneously received by the antennas 21 and 22 of the carrier 20. In consequence, it is necessary to arrange the antennas 21 and 22 so as to be separated within a range of distance in which the microwave emitted from the antenna 11 can be received.

The antennas 21 and 22 of the carrier 20 are favorably disposed such that a plane formed by these antennas is parallel of a plane of the antenna 11 of the main apparatus 10. However, there may occur a case where an object on which the data carrier 20 is installed is associated with a rotary angle $\theta$. When the antenna 21 is inclined by an angle $\theta$ with respect to an X axis (vertical direction), the plane of polarization undergoes an intersection. In order to guarantee an appropriate operation even in such a case, the modulator system of the data carrier 20 including the transmission path 23, the hybrid coupler 24, and the modulator circuit 25 and the antennas are designed with a high precision.

Figure 3:
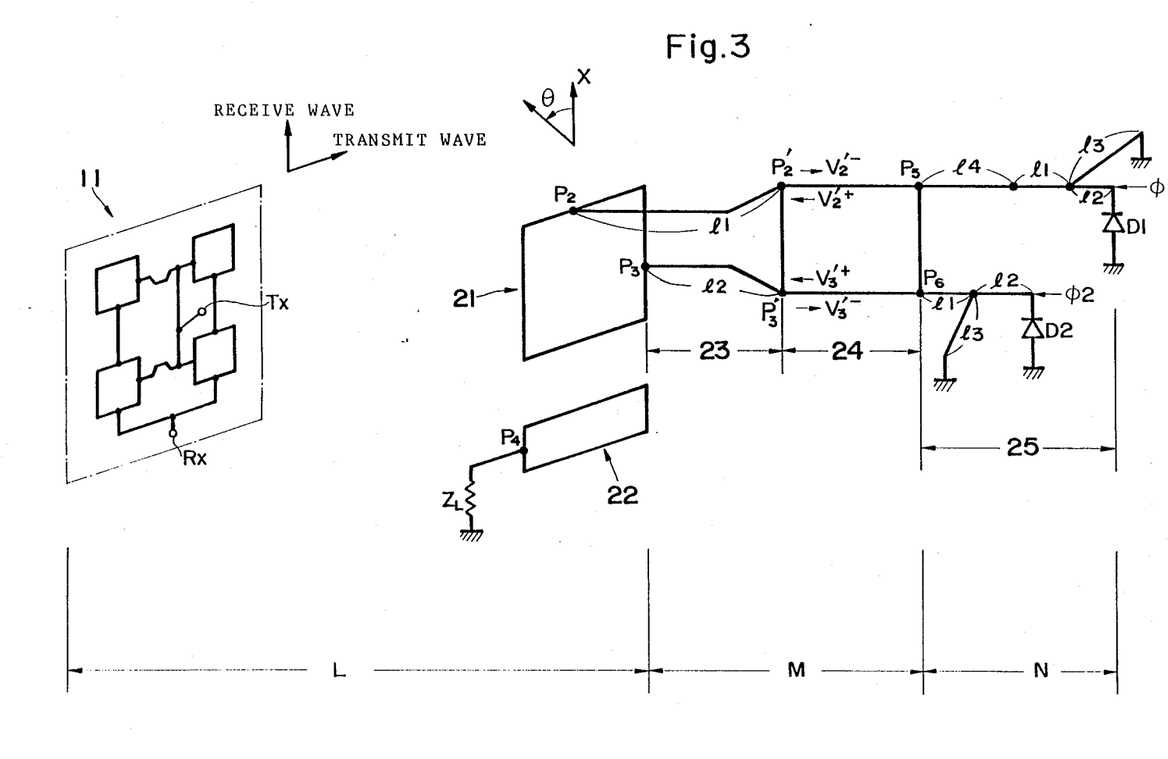
FIG. 3 is a wiring diagram of a modulator circuit and peripheral circuits of the data carrier.

FIG. 3 shows a wiring configuration of the microwave circuit elements associated with the antenna 11 of the main apparatus 10 and components ranging from the antennas 21 and 22 up to the modulator circuit 25 of the data carrier 20. In this diagram, reference symbols $P_2$, $P_3$, $P_4$, $P_5$, $P_6$, $P_2'$, $P_3'$ are assigned to the respective ports of the antennas 21 and 22 and to the nodes of the hybrid coupler 24 (bidirectional coupler). The ports $P_2$, $P_3$ of the antenna 21 corresponds to the transmit terminals S and receive terminal R, respectively. The suffix numerals 2 to 6 of the symbols P or P' are also applied to the voltage V, scattering parameter S, characteristic impedance Z, and reflection coefficient $\Gamma$ in the expressions to be described later. That is, the suffix numerics of the voltage V, scattering parameter S, characteristic impedance Z, and reflection coefficient $\Gamma$ are the same as those of the symbols P and P' representing ports or nodes related thereto. In addition, with respect to the transmit terminal Tx and the receive terminal Rx of the antenna 11, there are employed suffix letters T and R for the physical quantities described above.

The hybrid coupler 24 is formed as a conductor pattern (branch line) on a printed board according to a known technology. Since a microwave is an objective wave to be processed in this situation, the transmission path 23 connecting the hybrid coupler 24 to the antenna 21 has also a characteristic as a circuit.

The modulator circuit 25 includes a distributed constant circuit having end terminals, which are respectively connected to diodes D1 and D2. When the signals $\phi 1$ and $\phi 2$ are respectively supplied to cathodes of the diodes D1 and D2, these diodes are turned on and off, which causes the reflection coefficient $\Gamma$ to vary at the nodes $P_5$ and $P_6$.

For explanation of the communication of the microwave between the antenas 11 and 21 and the modulation effected by the data carrier 20, the configuration is subdivided for convenience into three portions L, M, and N as shown in FIG. 3.

Figure 4:
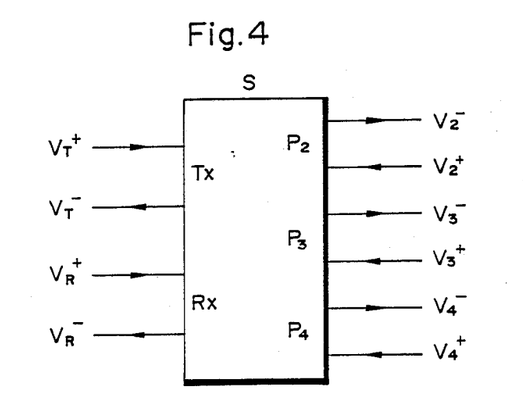
FIG. 4 is an equivalent circuit diagram of a microwave transmission path between the main apparatus and the data carrier.

First, description will be given of the portion L, which is a transmission route including a space. By use of S parameters, the voltages of the respective ports T x, R x, $P_2$, $P_3$, $P_4$ of the antenna 11, 21, and 22 are represented by an expression (1). This expression applies to a case where the portion L is represented by an equivalent circuit of FIG. 4 in which a signal incoming direction and a single outgoing direction are indicated by the plus sign (+) and the minus sign (−) respectively.

$$\begin{bmatrix} V_T^-/\sqrt{Z_T} \\ V_R^-/\sqrt{Z_R} \\ V_2^-/\sqrt{Z_2} \\ V_3^-/\sqrt{Z_3} \\ V_4^-/\sqrt{Z_4} \end{bmatrix} = \begin{bmatrix} S_{TT} & S_{TR} & S_{T2} & S_{T3} & S_{T4} \\ S_{TR} & S_{RR} & S_{R2} & S_{R3} & S_{R4} \\ S_{T2} & S_{R2} & S_{22} & S_{23} & S_{24} \\ S_{T3} & S_{R3} & S_{23} & S_{33} & S_{34} \\ S_{T4} & S_{R4} & S_{24} & S_{34} & S_{44} \end{bmatrix} \times \begin{bmatrix} V_T^+/\sqrt{Z_T} \\ V_R^+/\sqrt{Z_R} \\ V_2^+/\sqrt{Z_2} \\ V_3^+/\sqrt{Z_3} \\ V_4^+/\sqrt{Z_4} \end{bmatrix} \quad (1)$$

where, Z is a characteristic impedance of each port and the suffix of Z denotes the associated port. In the S matrix representation, there is employed the symmetric feature of the S parameters (e.g. $S_{23}=S_{32}$). Since there exists a difference of 90° in the polarization plane between the wave transmitted from the antenna 21 (port $P_2$) and the wave receive by the antennas 21 and 22 (ports $P_3$, $P_4$), $S_{23}=S_{24}=0$ holds. In addition, since the port $P_4$ is linked to the impedance $Z_L$, the following expression is attained.

$$V_4^+ = \Gamma_L V_4^- \quad (2)$$

Reflection coefficient $\Gamma_L = (Z_L - Z_4)/(Z_L + Z_4)$

Furthermore, in the antenna 11, the antenna pattern is formed such that an impedance matching takes place in each of the ports Rx and Tx. Moreover, it is considered that $V_T^-$ does not influence $V_T^+$ (the transmitted wave is not influenced by the reflection wave) and that $V_R^+$ is set to 0.

Applying the conditions above to the expression (1), there can be attained the receive signal components of the ports $P_2$, $P_3$ and $P_4$ of the antennas 21 and 22 and of the port Rx of the antenna 11, which are represented as follows.

$$V_4^-/\sqrt{Z_4} = \frac{S_{T4}(V_T^+/\sqrt{Z_T}) + S_{34}(V_3^+/\sqrt{Z_3})}{1 - \Gamma_L S_{44}} \quad (3-1)$$

$$V_3^-/\sqrt{Z_3} = (V_T^+/\sqrt{Z_T}) \cdot [S_{T3} + S_{34}\Gamma_L S_{T4}/(1 - \Gamma_L S_{44})] + (V_3^+/\sqrt{Z_3}) \cdot [S_{33} + S_{34}^2 \Gamma_L/(1 - \Gamma_L S_{44})] \quad (3-2)$$

$$V_R^-/\sqrt{Z_R} = (V_T^+/\sqrt{Z_T}) [S_{TR} + S_{R4}S_{T4}\Gamma_L/(1 - \Gamma_L S_{44})] + S_{R2}V_2^+/\sqrt{Z_2} + (V_3^+/\sqrt{Z_3}) \cdot [S_{R3} + S_{R4}\Gamma_L S_{34}/(1 - \Gamma_L S_{44})] \quad (3-3)$$

$$V_2^-/\sqrt{Z_2} = S_{T2}(V_T^+/\sqrt{Z_T}) + S_{22}(V_2^+/\sqrt{Z_2}) \quad (3-4)$$

Next, the portion M of FIG. 3 will be described. This section M includes the hybrid coupler 24 and the transmission path 23. A problem here is the impedance appearing in the transmission path 23 linking the hybrid coupler 24 to the antenna 21.

For convenience, description will be first given of the analysis of the hybrid coupler 24, which is constituted with branch lines (conductor pattern lines) drawn among the nodes $P_2'$, $P_3'$ and $P_5$, $P_6$. The distance between nodes along the respective lines is set to $\lambda/4$. Assuming the reflection coefficients respectively at the nodes $P_5$ and $P_6$ to be $\Gamma_5$ and $\Gamma_6$, the relationship of voltages developed at the nodes $P_2'$, $P_3'$ are represented by use of the S parameters as follows.

$$\begin{bmatrix} V_2'^+/\sqrt{Z_B} \\ V_3'^+/\sqrt{Z_B} \end{bmatrix} = \begin{bmatrix} \frac{\Gamma_6 - \Gamma_5}{2} & j\frac{\Gamma_6 + \Gamma_5}{2} \\ j\frac{\Gamma_6 + \Gamma_5}{2} & \frac{\Gamma_5 - \Gamma_6}{2} \end{bmatrix} \times \begin{bmatrix} V_2'^-/\sqrt{Z_B} \\ V_3'^-/\sqrt{Z_B} \end{bmatrix} \quad (4)$$

where $Z_B$ designates a characteristic impedance of the branch lines.

A problem associated with the antenna system is that as described above, when the antennas 21 and 22 to be arranged in a plane parallel to the plane of the antenna 11 are inclined by an angle of $\theta$ with respect to the X axis in this parallel plane, there arise changes in the scattering parameters $S_{T2}$, $S_{T3}$, $S_{T4}$, $S_{R2}$, $S_{R3}$ and $S_{R4}$. Parameters $S_{TK}$ and $S_{RK}$ (K=2, 3, 4) are represented as follows.

$$S_{TK} = {}^{90}S_{TK} \sin\theta + {}^{0}S_{TK} \cos\theta \quad (5-1)$$

$$S_{RK} = \alpha[{}^{90}S_{TK}\cos\theta - {}^{0}S_{TK}\sin\theta] \quad (5-2)$$

where, α indicates a constant determined by the antenna characteristic and $^{90}S_{TK}$ and $^{0}S_{TK}$ are scattering parameters $S_{TK}$ for $\theta=90°$ and $0°$, respectively.

From the positional relationship between the antenna 11 of the main apparatus 10 and the antennas 21 and 22 of the data carrier 20, $^{0}S_{T2}=0$ results.

Taking the inclination angle $\theta$ into consideration, the voltage $V_R^-$ to be received by the antenna 11 is computed by use of the expression above. It is assumed here that the matching condition is satisfied between the nodes P$_2$ and P$_2'$ and between the nodes P$_3$ and P$_3'$ and that the respective transmission parameters are $S_{2L}$ and $S_{3L}$. The receive voltage $V_R^-$ depends on a microwave emitted from the data carrier 20 via the following two paths. One of the paths is a route which travels through each port of the branch lines as follows (a path of a transparent type).

The other one of the paths is a route as shown below in which a reflection takes place at an input end of the branch lines (a path of a reflection type).

The receive voltage (with a suffix tr) of the transparent type is attained by effecting computations through the route above and is represented as follows.

$$(V_R^-/\sqrt{Z_R})_{tr} = (V_T^+/\sqrt{Z_T})\alpha S_{2L}S_{3L}(\Gamma_5 + \Gamma_6)/2 \cdot \qquad (6)$$

$$^{90}S_{T2}[^{0}S_{T3}' \cos2\theta + ^{90}S_{T3}' \sin2\theta]$$

In this expression, for $\theta=90°$ and $0°$, the following relationship holds.

$$^{\theta}S_{T3}' = {^{\theta}S_{T3}} + S_{34}\Gamma_L{^{\theta}S_{T4}}/(1-\Gamma_L S_{44}) \qquad (7)$$

On the other hand, the receive voltage (with a suffix rf) of the reflection type is represented as follows.

$$(V_R^-/\sqrt{Z_R})_{rf} = (V_T^+/\sqrt{Z_T})\alpha(\Gamma_6 - \Gamma_5)/2 \cdot \qquad (8)$$

$$[\{(^{90}S_{T2}S_{2L})^2 + S_{3L}^2(^{0}S_{T3}'^2 - ^{90}S_{T3}'^2)\} \cdot$$

$$\sin2\theta/2 - ^{90}S_{T3}' {^{0}S_{T3}'} S_{3L}^2 \cos2\theta]$$

The antenna 11 receives the sum of the two components (expressions (6) and (8)). As will be described in conjunction with the portion N later, the modulation effected in the modulator circuit 25 is achieved to set the reflection coefficients $\Gamma_5$ and $\Gamma_6$ so as to attain the maximum values of $(\Gamma_5+\Gamma_6)$, and hence it is required that only the constitutent element $(\Gamma_5+\Gamma_6)$ of the receive voltage is to be received. For this purpose, the following conditions need only be set.

$$^{90}S_{T3}' = 0 \text{ and}$$

$$(^{90}S_{T2}S_{2L})^2 + (^{0}S_{T3}'S_{3L})^2 = 0$$

For $^{90}S_{T3}'=0$, there are set $^{90}S_{T3}'=0$ and $^{90}S_{T4}=0$ based on the expression (7). Since these conditions are satisfied so long as P$_3$ does not interfer with P$_4$, it need only be necessary to arrange P$_3$ and P$_4$ so as to be desirably separated within a range in which the radio wave beam can be communicated.

On the other hand, for satisfying $$(^{90}S_{T2}S_{2L})^2 + (^{0}S_{T3}'S_{3L})^2 = 0$$

if $$|^{90}S_{T2}| \leq |^{0}S_{T3}'|$$

the transmission path 23 need only be designed to satisfy $$-(S_{3L})^2 = (^{90}S_{T2}/^{0}S_{T3}')^2(S_{2L})^2$$

Next, the portion N of FIG. 3 will be described. This portion N includes the modulator circuit 25 of a distribution type employing a 4-level (4-phase) phase change. The four levels are implemeted by changing the reflection coefficients $\Gamma_5$, $\Gamma_6$ of the nodes P$_5$, P$_6$ of the hybrid coupler 24 through an operation to turn the diodes D1 and D2 on and off.

The modulator circuit 25 is constituted with a disttributed constant circuit and diodes D1 and D2 as shown in FIG. 3. The distributed constant circuit includes lines, which are assumed to have lengths l1, l2, l3, and l4, respectively as shown in the diagram. The diodes D1 and D2 are connected to end terminals of the distributed constant circuit such that the anodes thereof are grounded and the cathodes thereof are supplied with the signals $\phi1$ and $\phi2$. The lengths l1, l2, and l3 are set so as to satisfy a relationship of $\Gamma_{6ON}=-\Gamma_{6OFF}$. In this expression, suffix letters ON and OFF indicate the on and off states of the diode, respectively, $\Gamma_{6ON}$ designates the reflection coefficient when the diode D2 is on, and $\Gamma_{6OFF}$ indicates the reflection coefficient when the diode D2 is off. The length l4 is set to be $\lambda/8$. With this provision, there appears a phase difference of 90° between signals in two lines by propagation in both ways. That is, the following expression holds.

$$\Gamma_{5ON} = -j\Gamma_{6ON}, \Gamma_{5OFF} = -j\Gamma_{6OFF}$$

In the 4-level phase modulation, it is necessary that ① a great change is developed in the 4-level phase change, that ② the phase variation caused by a change in the distance between the main apparatus 10 and the data carrier 20 is small, and that ③ in association with the inclination (the angle of $\theta$) of the data carrier 20 in the plane of the antenna, a range which becomes to be uncommunicable is small. In order to increase the 4-level phase change in association with ① above, it is only necessary to set a phase difference between the reflection coefficients $\Gamma_5$ and $\Gamma_6$ to $\pm90°$ and to turn the diodes D1 and D2 on and off so as to change the phases by 180°.

To reduce the influence with respect to the distance as described in ② above, it is required to set $$|\Gamma_{6ON}| = |\Gamma_{6OFF}| = |\Gamma_{5ON}| = |\Gamma_{5OFF}|$$

so as to increase the absolute quantity of the change in the reflection coefficients.

In order to minimize the uncommunicable range associated with the inclination angle as described in 3 above, it is only required to detect only the term of $(\Gamma_5+\Gamma_6)$ of the received voltage.

The modulation is conducted such that by use of a pulse sequence of the signals $\phi_1$ and $\phi_2$ having a phase difference of 90° therebetween, the diodes D1 and D2 are turned on and off so as to change the phase of the reflection radio wave from the antenna 21 in four levels in a circular manner. Since the length l4 is set to be $\lambda/8$, the reflection coefficients $\Gamma_5$ and $\Gamma_6$ are associated with a phase difference of 90° therebetween; furthermore, the signals $\phi_1$ and $\phi_2$ have a phase difference of 90° therebetween, in consequence, the reflection coeficients develop a 4-level change in a sense of a vector.

Figure 5A:
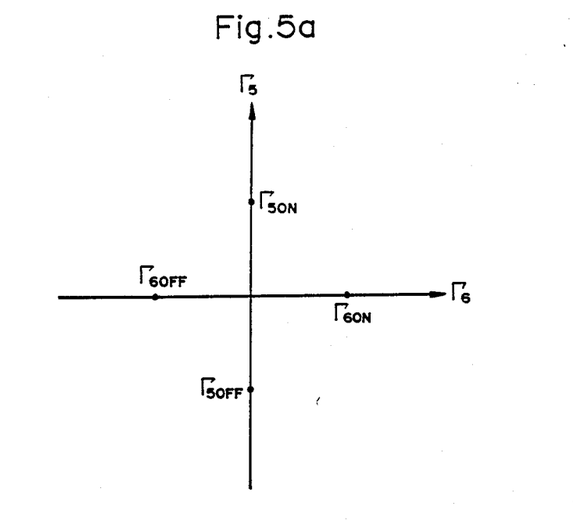
FIGS. 5a to 5c are vector diagrams showing reflection coefficients.
Figure 5B:
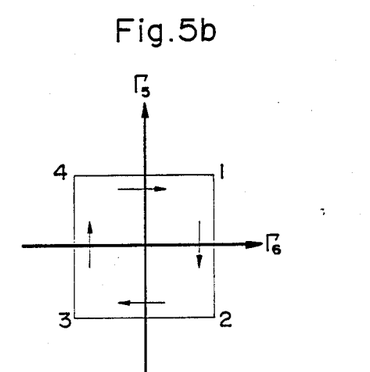
Figure 5C:
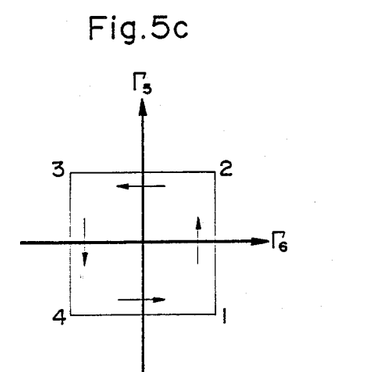

In the vector representation (with $\Gamma_5$ and $\Gamma_6$ axes) of FIG. 5a, when the change of the reflection coefficients is circulated as $$(\Gamma_{50N}, \Gamma_{60N})_1 \rightarrow (\Gamma_{60N}, \Gamma_{50FF})_2 \rightarrow (\Gamma_{60FF}, \Gamma_{50FF})_3 \rightarrow$$

$$(\Gamma_{60FF}, \Gamma_{50N})_4 \rightarrow (\Gamma_{50N}, \Gamma_{60N})_1$$

the phase change of the component associated with the $(\Gamma_6+\Gamma_5)$ term is developed as shown in FIG. 5b, namely, there appears a rotary change from 1 to 4. On the other hand, the component of the $(\Gamma_6-\Gamma_5)$ term rotates in the reverse direction as shown in FIG. 5c. In consequence, when these components are overlapped with each other, there appears a portion in which the values are cancelled with each other, which causes the communication to be prevented depending on the inclination angle. In this embodiment, since only the component of the $(\Gamma_6+\Gamma_5)$ term is to be detected, the problem above does not take place. As can be seen from the expression (6), the received voltage $V_R^-$ is proportional to $\cos 2\theta$, and hence the level change is small with respect to the change in the angle $\theta$.

The rotary speed is changed, as described above, in association with the change in the frequencies of the signals $\phi_1$ and $\phi_2$, namely, in the data ("1" or "0") to be transmitted.

Description will now be given of the overall operation of the signal transmission system including the main apparatus 10 and the data carrier 20.

The main apparatus 10 sends from the transmit section thereof a microwave modulated depending on a status read command and then transmits a nonmodulated microwave carrier for a predetermine period of time. A set of the transmit processing of the microwave modulated depending on a status read command and that of the nonmodulated microwave carrier is repeatedly conducted at a predetermined interval. While the nonmodulated microwave is being transmitted, the CPU 19 of the main apparatus 10 monitors by means of the receive section whether or not there is received a microwave modulated by and reflected from the data carrier 20.

If the data carrier 20 is not in a range in which the microwave sent from the main apparatus 10 can be received, there is not received a response from the data carrier 20; in consequence, the main apparatus 10 repeatedly effects the set of transmit processing.

When data carrier 20 enters a range in which communications can be achieved with the main apparatus 10, the receive section of the data carrier 20 receives a status read command from the main apparatus 10. In response to the status read command, the controller 28 reads an identification code from the memory 29 so as to transmit a status read response including the identification code. That is, the nonmodulated microwave carrier received by the antenna 21 of the data carrier 20 undergoes the 4-level modulation by use of the status read response data in the modulator circuit 25 and is then inflectively transmitted from the antenna 21.

On receiving the status read response, the main apparatus 10 modulates the carrier wave by use of a read/-write command (and data to be written in the memory, if necessary) and then transmits the resultant wave; subsequently, the nonmodulated microwave carrier is transmitted for a predetermined period of time.

When the data carrier 20 receives the read/write command by means of the receive section thereof, the controller 28 achieves another processing in association with the command. Namely, a predetermined data item is read from the memory 29 or the data sent from the main apparatus 10 is written therein. When the operation of this processing is completed, the controller 28 edits a read/write response to report the result of the processing and then modulates the nonmodulated carrier being received by use of the response data, thereby reflectively transmitting the obtained wave.

If necessary, there are repeately effected the transmission of the read/write command from the main apparatus 10 and that of the read/write response from the data carrier 20.

As described above, the main apparatus 10 and the data carrier 20 achieve a half duplex communication therebetween while the data carrier 20 is passing through the communicable range before the main apparatus 10. As a result, the main apparatus 10 conducts read/write operations on the memory of the data carrier 20.

In this embodiment, the microwave modulated by the data carrier 20 is demodulated through the homodyne synchronized detection in the main apparatus 10. If the data carrier 20 employs the 2-level phase modulation, there may take place a case depending on the distance between the data carrier 20 and the main apparatus 10 where when the receive signal has a symmetric relationship with respect to the local oscillation signal in the homodyne detection, these signals cancel each other and hence cannot be detected. In this embodiment, since the data carrier 20 adopts the 4-level phase modulation, regardless of the distance between the data carrier 20 and the main apparatus 10, it is possible in the homodyne detection to attain as a signal amplification the phase difference between the local oscillation signal and the receive signal.

Figure 6:
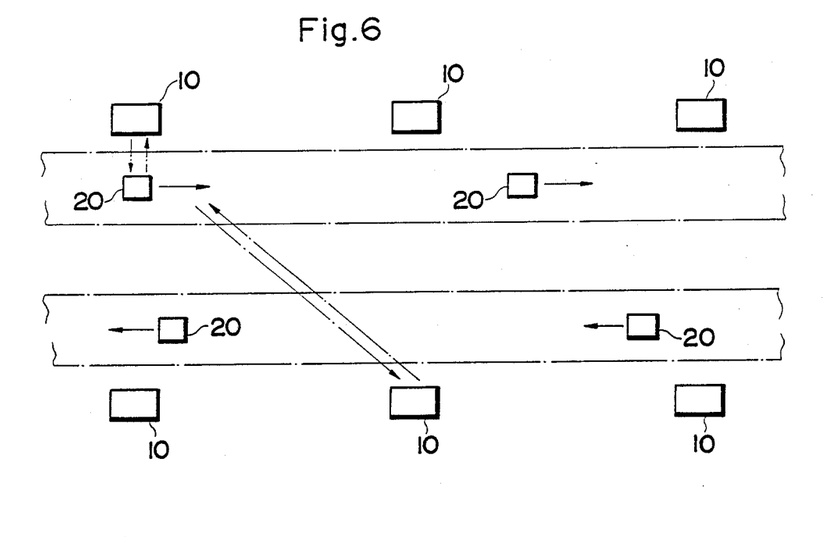
FIG. 6 is a schematic diagram showing an arrangement of a plurality of main apparatuses disposed in a production line.

The present invention is not restricted by the system including one main apparatus, namely, the present invention is also applicable to a system comprising a plurality of main apparatuses. For example, as shown in FIG. 6, let us consider a case where there exist two lines of conveyor systems, namely, a first conveyor system and a second conveyor system arranged in parallel to each other with a short distance therebetween such that objects on which data carriers 20 are respectively attached are transported by these conveyors. Along each transportation path of the first and second conveyors, there are arranged the main apparatuses with an appropriate interval therebetween, for example, for each production porcess to be effected along the conveyor systems. Each main apparatus 10 communicates with a data carrier 20 passing through a place before the main apparatus 10 so as to effect data communications with the data carrier 20.

In such a system, there may occur a case where while a main apparatus 10 is communicating with a data carrier 20 passing before the main apparatus 10, a radio wave from another main apparatus 10 is received so as to cause a radio interference. Particularly, a reflection wave editted from the data carrier 20 has quite a low energy and hence is easily subjected to a disturbance by a strong radio wave from another main apparatus 10. If it is possible for the plural main apparatuses 10 to use carriers of the different frequencies, respectively, the chance of occurrence of the interference is reduced; however, since the available frequencies are limited by the laws and rules concerning the radio waves, it is required for the plural main apparatus to employ the identical frequencies or frequencies which are quite similar to each other.

Figure 7:
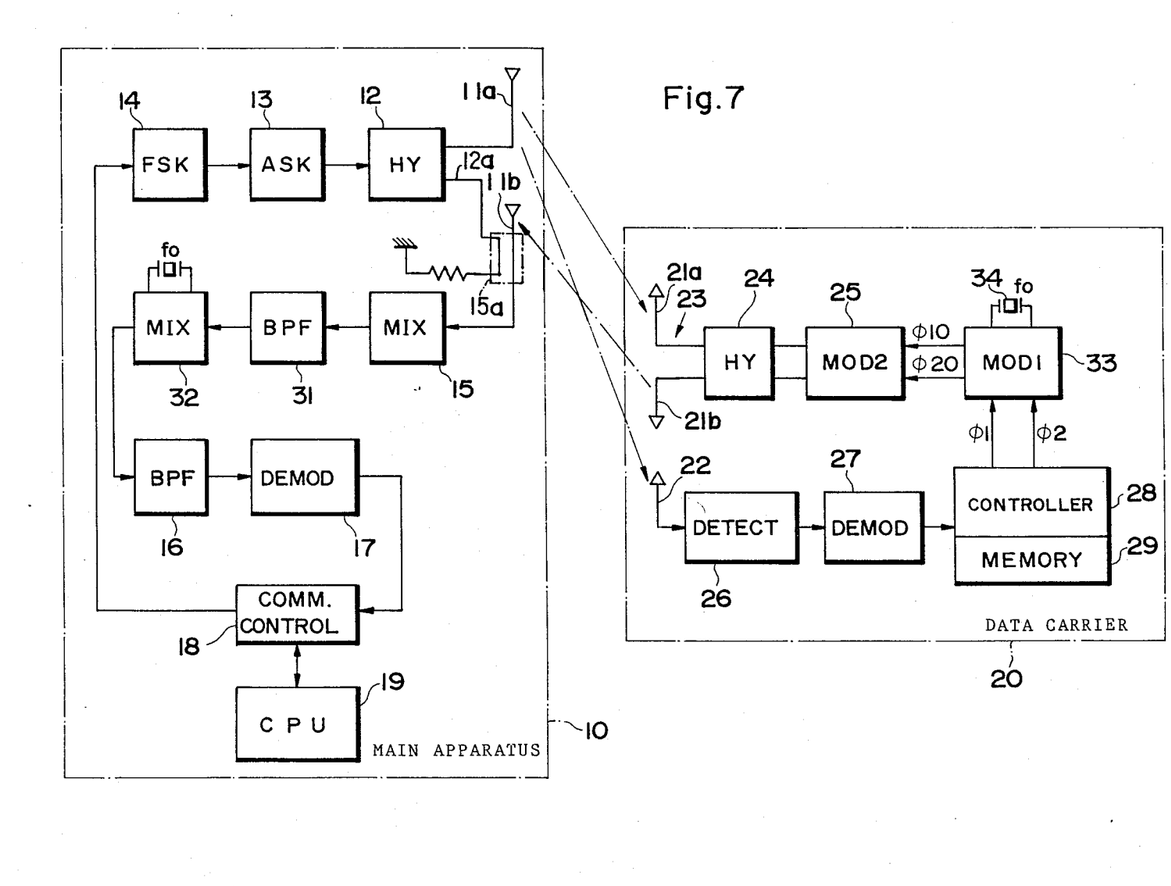
FIG. 7 is a block diagram schematicaly showing an electric configuration of a signal transmission system including a main apparatus and a data carrier as an alternative embodiment according to the present invention.

FIG. 7 shows an alternative embodiment including a plurality of main apparatuses 10 particularly suitable for a system in which the radio interference is likely to take place. The same constitutent components as those of FIG. 1 are assigned with the same reference numerals and description thereabout will be avoided.

The main apparatus 10 includes a transmit antenna 11a and a receive antenna 11b, which are constructed such that the plane of polarization of a microwave transmitted from the transmit antenna 11a is shifted by 90° from that of a microwave received the receive antenna 11b. For example, the antenna 11a sends a vertically polarized wave, whereas the antenna 11b receives a horizontally polarized wave. These antennas 11a and 11b may be implemented by use of the antenna 11 of FIG. 1.

The transmit section for emitting a microwave modulated by use of a command or data and a nonmodulated microwave from the antenna 11a is the same as that shown in FIG. 1. The recieve section for demodulating the signal received by the antenna 11b is different from that employed in the embodiment above and hence will be described in detail later.

In the data carrier 20, the reciever antennas 21a and 22 receive a vertically polarized wave. The antenna 21b transmits a horizontally polarized wave. The antennas 21a and 21b may be configured by use of a transmit and receive antanna 21 of FIG. 1. The receive section connected to the antenna 22 is identical to that of FIG. 1. The carrier received by the antenna 21a is modulated depending on data to be sent from the transmit section and is then reflectively emitted from the antenna 21b.

The modulation method of modulating the receive carrier is different from that adopted in the embodiment of FIG. 1. In this embodiment, there are disposed two modulator circuits 25 and 33 to conduct a multiplex modulation on the carrier.

Figure 8:
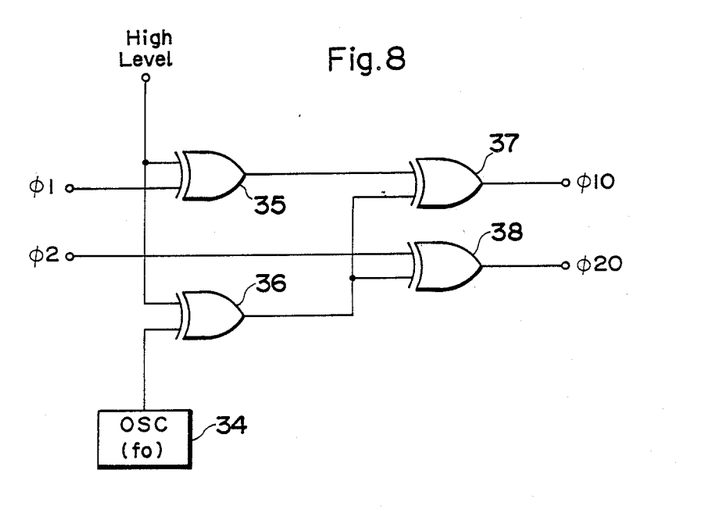
FIG. 8 is a schematic circuit diagram showing a modulator circuit of a subcarrier in the data carrier.

Both the signals $\phi$ and $\phi 2$ set to 50 kHz or 30 kHz according to the transmission data are supplied to the first modulator circuit 33. FIG. 8 shows a specific constitution example of the first modulator circuit 33. The modulator circuit 33 includes an oscillator circuit 34 for producing a subcarrier (having a frequency of, for example, 10.738 kHz) and exclusive OR circuits 35, 36, 37, and 38 for modulating the subcarrier respectively depending on the signals $\phi 1$ and $\phi 2$ so as to generate signals $\phi 10$ and $\phi 20$.

The output signals $\phi 10$ and $\phi 20$ produced from the first modulator circuit 33 are delivered to the second modulator circuit 25, which is configured in the same fashion as for the modulator circuit 25 of FIG. 1, namely, there exists only a difference therebetween that the modulation signals are indicated as $\phi 10$ and $\phi 20$ FIG. 7. The carrier signal received by the antenna 21a and then supplied via the hybrid coupler 24 to the second modulator circuit 25 undergoes a phase modulation by use of reflection coefficients to be changed depending on the signals $\phi 10$ and $\phi 20$; furthermore the wave is reflected so as to be emitted via the hybrid coupler 24 from the antenna 21b.

Figure 9:
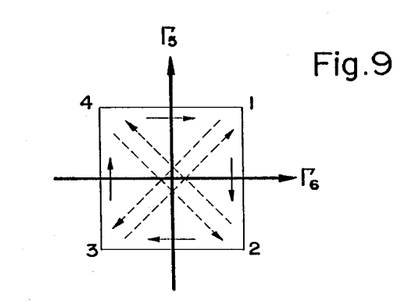
FIG. 9 is a vector diagram showing reflection coefficients.

As described with reference to FIG. 5b (or FIG. 5c), in the 4-level phase modulation above, the reflection coefficients are rotated as $1 \to 2 \to 3 \to 4$ according to the frequency (represented by $\Delta f$, $\Delta f = 40$ kHz $\pm 10$ kz) of the signals $\phi 1$ and $\phi 2$. In this embodiment, the reflection coefficients are changed by the signals $\phi 10$ and $\phi 20$ produced by modulating the subcarrier (with a frequency f0; f0 = 10.738 MHz) depending on the signals $\phi 1$ and $\phi 2$, when the rotation of the reflection coefficients is achieved as $1 \to 2 \to 3 \to 4$ with the frequency $\Delta f$, there occur the charges as $1 \to 3 \to 1 \to 3$ and as $2 \to 4 \to 2 \to 4$ with the frequency f0 as indicated by broken lines of FIG. 9.

Figure 10:
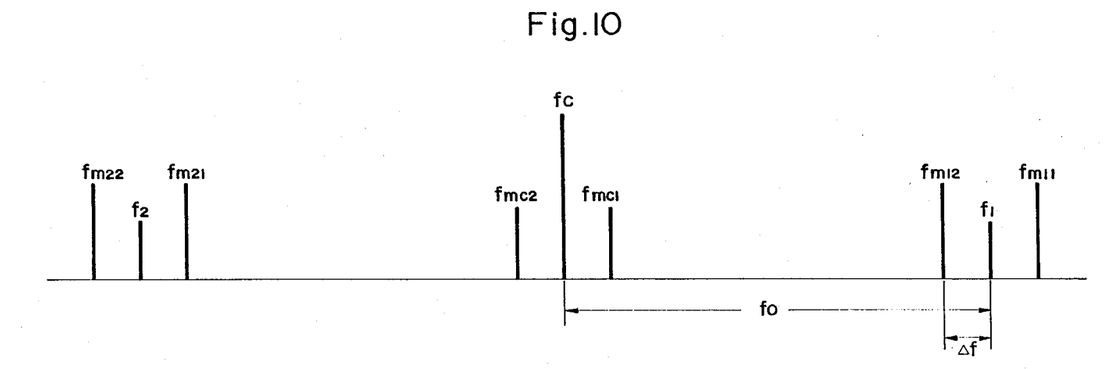
FIG. 10 is a schematic diagram showing frequency spectra undergone a duplicated modulation.

FIG. 10 shows frequency spectra of reflection wave emitted from the antenna 21b in which fc indicates a carrier (and a frequency thereof). At a location apart from the frequency by a distance equivalent to the subcarrier frequency f0 in the higher and lower frequency directions, there appear the upper and lower sideband waves f1 and f2 associated with the subcarrier.

$$f1 = fc + f0$$

$$f2 = fc - f0$$

In addition, at the higher and lower frequency positions of the upper sideband wave f1, there appear the upper and lower sideband waves fm11 and fm12 as follows.

$$fm11 = fc + f0 + \Delta f$$

$$fm12 = fc + f0 - \Delta f$$

Furthermore, at the higher and lower frequency positions of the lower sideband wave f2, there appear the upper and lower sideband waves fm21 and fm22.

$$fm21 = fc - f0 + \Delta f$$

$$fm22 = fc - f0 - \Delta f$$

These reflection waves are received by the antenna 11b of the main apparatus 10 so as to be demodulated in the receive section thereof. The received signal is coupled with an output 12a (carrier frequency fc) from the hybrid coupler 12 by a hybrid coupler 15a to be fed to the mixer 15. A signal having a difference frequency between the frequency of the receiver signal and the carrier frequency fc is obtained as an output of the mixer 15. The mixer 15 generates the output signal to be supplied to the band-pass filter 31, which passes a signal component having a frequency of (f0 − Δf), namely, there are extracted the sideband waves fm12 and fm21. The output signal from the filter 31 is thereafter supplied to the mixer 32 including a local oscillator circuit of a frequency f0 such that there is outputted signals having difference frequencies between the frequencies of the input signals fm12 and fm21 and the frequency of the local oscillation signal f0, thereby deliverig the resultant signal to the low-pass filter 16. The filter 16 is disposed to extract a signal component having a frequency Δf as described above. The filter 16 thus produces an output signal, which is then fed to the demodulator circuit 17 so as to undergo a phase demodulation, thereby attaining the data transmitted from the data carrier 20.

As described above, since the received wave to be used by the main apparatus to obtain data sent from the data carrier frequency (for example, by about 10 MHz), even in a case, for example, where there are disposed many main apparatuses and the carrier frequencies thereof are identical or quite similar to each other, the operation of the system is not likely to be subjected to an influence from another main apparatus and an appropriate data communication can be conducted.

In a case where a large metal object is present on the rear side of the data carrier, the microwave carrier emitted from the main apparatus is reflected on the metal object and is then returned to the main apparatus. In consequence, there arises a problem that the reflection carrier signal from the data carrier undergoes a supression and hence cannot be received by the main apparatus. In this embodiment, however, since the data is not obtained from the carrier wave, the problem above does not take place.

When the subcarrier is not used, it is required to discriminate a signal component with a modulated signal frequency quite similar to the carrier frequency for the signal detection, which causes the receive circuit to be complicated; furthermore, there appears a problem that a critical requirement is imposed on the precision of the oscillation frequency of the carrier. In this embodiment, since the data is moduated by use of the sideband waves having frequencies apart from the carrier frequency by the subcarrier frequency in the higher and lower frequency directions, such a critical precision is not required for the carrier oscillation frequency; moreover, the band-pass filter need only be a filter associated with a band of the subcarrier frequency and hence there is not required quite a high precision for the designing of the filter.

Although the band-pass filter 31 is configured to extract the sideband waves fm12 and fm21, the filter 31 may be constituted so as to obtain the sideband waves fm11 and fm22. Furthermore, in the embodiment above, in order to minimize the size of the aparatus and to reduce an influence from the external disturbance, the plane of polarization of the reflection wave is shifted from that of the received wave by 90° in the data carrier; however, the present invention is not necessarily restricted by this embodiment.

In this embodiment, the data carreir employs as a phase modulation method using the data a 4-level phase modulation in which the phases are shifted respectively by 90°; however, although the modulation circuit may be complicated, it is naturally possible to effect the phase moduation of a higher order such as the 8-level or 16-level phase keying.

Moreover, if the NRZ codes representing the data are converted into the bi-phase or Manchester codes, the reliability of the data is increased.

What is claimed is:
1. A signal transmission system comprising:
   a data carrier;
   a memory located in said data carrier to store therein data including an identification code associated with an object;
   a main apparatus having a microwave oscillator so as to effect communications with said data carrier by use of a microwave, enabling said main apparatus to write data into or read data from said memory of said data carrier;
   first modulating means connected to said main apparatus for modulating said microwave by use of a command or data to be sent to said data carrier;
   first transmit means connected to said main apparatus for transmitting said modulated microwave and for thereafter transmitting a nonmodulated microwave carrier for a predetermined period of time;
   first receiving means attached to said main apparatus for receiving a microwave returned from said data carrier so as to demodulate the received microwave to obtain data;
   second receiving means connected to said data carrier for receiving said microwave sent from said first transmit means so as to demodulate the received microwave to obtain a command or data;
   control means connected to said data carrier for executing a read/write operation on said memory depending on the received command;
   second transmit means connected to said data carrier for returning to said main apparatus response data indicating that a read/write operation has been conducted on said memory;
   antenna means connected to said second transmit means for receiving said monmodulated microwave carrier and for reflectively transmitting a modulated microwave; and
   second modulating means connected to said antenna means for changing reflection coefficients of the microwave in said antenna means in four levels in a sense of a vector depending on response data to be transmitted, thereby conducting a modulation of quadrature phase-shift keying on the received microwave carrier.

2. A signal transmission system according to claim 1, wherein when said second receiving means receives said command, causing said control means to activate operation of said second modulating means.

3. A signal transmission system according to claim 2, wherein when said first transmit means repeatedly transmits at a predetermined interval said microwave modulated by a predetermined command and said nonmodulated microwave.

4. A signal transmission system according to claim 1, wherein said second modulating means further comprises:
   an oscillator for generating a subcarrier;
   a subcarrier modulator for modulating said subcarrier generated by said oscillator by use of data to be transmitted; and
   a coefficient modulator for changing said reflection coefficients of said microwave in said antenna means depending on a signal outputted from said first subcarrier modulator, thereby conducting the quadrature phase-shift keying on the received microwave carrier.

5. A signal transmission system according to claim 1, wherein:
   said first transmit means and said first receiving means are provided with a transmit/receive antenna to be shared therebetween such that said transmit/received antenna is configured to transmit a first microwave and to receive a second microwave the latter of which microwave has a plane of polarization shifted from a plane of polarization of said first microwave by 90 degrees; and said antenna means is configured to transmit a microwave having a plane of polarization shifted from a plane of polarization of the received microwave by 90 degrees.

6. A signal transmission system according to claim 1, wherein said second modulating means demodulates said microwave received by said antenna means.

7. A signal transmission system according to claim 1, wherein said second transmit means further comprises:
 a distributed constant modulator including two lines respectively connected via predetermined transmission paths to a transmit port and a receiver port respectively of said antenna means wherein said two lines have a difference of λ/8 therebetween; and
 diode respectively connected to end terminals of said two lines such that said diodes are turned on and off by signals representing data to be transmitted, thereby changing said reflection coefficients.

8. A signal transmission system, comprising
 a data carrier;
 a memory located in said data carrier to store data including an identification code associated with an object;
 a main apparatus;
 a microwave oscillator located in said main apparatus so as to effect communications with said data carrier by use of said microwave, thereby writing data in or reading data from said memory in said data carrier;
 first transmit means located in said main apparatus for modulating a microwave by use of a command or data to send to said data carrier so as to transmit the modulated microwave and for thereafter transmitting a nonmodulated microwave carrier for a predetermined period of time;
 first receiving means located in said main apparatus for receiving a microwave returned from said data carrier so as to demodulate said received microwave in order to obtain data;
 second receiving means located in said data carrier for receiving a microwave sent from said main apparatus so as to demodulate said received microwave to obtain a command or data;
 control means located in said data carrier for executing a read/write operation on said memory depending on the received command;
 second transmit means located in said data carrier for returning to said main apparatus response data indicating that a read/write operation has been conducted on said memory;
 antenna means connected to said second transmit means for receiving said nonmodulated microwave carrier and for reflectively transmitting a modulated microwave;
 oscillating means connected to said second transmit means for generating a subcarrier;
 third modulating means for modulating said subcarrier generated by said oscillating means by use of a response data to be transmitted; and
 a fourth modulating means for changing reflection coefficients of the microwave in said antenna means depending on a signal outputted from said third modulating means, thereby conducting a modulation on the received microwave carrier.

9. A signal transmission system according to claim 8, wherein said first receiving means of said main apparatus further comprises:
 a mixer for mixing a received signal with a signal having a carrier frequency;
 a band-pass filter for extracting one of a plurality of sideband waves respectively having central frequencies apart from the carrier frequency by a distance equivalent to the subcarrier frequency in higher and lower frequency directions; and
 demodulating means for demodulating an output delivered from said band-pass filter so as to obtain data.

10. A signal transmission system according to claim 8, wherein said fourth modulating means changes said reflection coefficients in said antenna means in four levels in a vector, thereby conducting a quadrature phase-shift keying on said received microwave carrier.

11. A signal transmission system according to claim 8, wherein said second receiving means receives said command in said data carrier said control means then causes operation of said second transmit means.

12. A signal transmission system according to claim 11, wherein when said first transmit means repeatedly transmits at a predetermined interval both a microwave modulated by use of a predetermined command and subsequently a nonmodulated microwave.

13. A signal transmission system according to claim 8, wherein:
 said first transmit means and said first receiving means are provided with a transmit/receive antenna to be shared therebetween such that said transmit/received antenna is configured to transmit a first microwave and to receive a second microwave which has a plane of polarization shifted from a plane of polarization of said first microwave by 90 degrees; and
 said antenna means is configured to transmit a microwave having a plane of polarization shifted from a plane of polarization of the received microwave by 90 degrees.

14. A signal transmission system, comprising:
 a main apparatus which comprises:
  a microwave oscillator;
  a first transmit means for modulating a microwave by use of a command or data so as to transmit said modulated microwave;
  a first receiving means for receiving a microwave so as to demodulate the received microwave to obtain data; and
  a transmit/receive antenna to be shared between said first transmit and first receiving means such that said transmit/receive antenna is configured to transmit a first microwave and to receive a second microwave having a plane of polarization shifted from a plane of polarization of said first microwave by 90 degrees; and a data carrier which comprises:
  a memory for storing data including an identification code associated with an object;
  a first receiving means for receiving a microwave sent from said main apparatus so as to demodulate the received microwave to obtain a command or data;

control means for executing a read/write operation on the memory depending on the received command;

second transmit means for returning to the main apparatus response data indicating a read/write operation thus conducted on the memory; and a reflection antenna which is configured to transmit a microwave having a plane of polarization shifted from a plane of polarization of the received microwave by 90 degrees.

15. A signal transmission system according to claim 14 wherein said second transmit means of said data carrier reflectively transmits a received microwave by means of said reflection antenna such that the reflection coefficients are changed by use of data to be transmitted, thereby modulating the received microwave.

16. A signal transmission system according to claim 14, wherein said first transmit means modulates a microwave carrier by use of a predetermined command so as to transmit the modulated microwave carrier and subsequently transmit a nonmodulated microwave carrier for a predetermined period of time.

17. A signal transmission system according to claim 16, wherein said first transmit means repeatedly transmits at a predetermined interval both a microwave modulated by use of a predetermined command and then a nonmodulated microwave.

18. A data transmission method comprising the steps of:

first modulating a microwave carrier by use of a predetermined command;

first transmitting said unmodulated carrier from a main apparatus;

second transmitting a nonmodulated microwave carrier from said main apparatus for a predetermined period of time such that a set having said modulated wave and said nonmodulated wave is repeatedly carried out at predetermined intervals of time;

receiving said predetermined command, in a data carrier;

second modulating said nonmodulated microwave carrier received after said predetermined command by use of initial response data;

third transmitting the resultant carrier from said data carrier as a reflection wave; and fourth modulating a microwave carrier in said main apparatus by use of a command or data so as to transmit said modulated carrier and thereafter transmit a nonmodulated microwave carrier such that on receiving the command or data, the data carrier modulates the received nonmodulated microwave by use of response data so as to transmit the resultant wave, thereby achieving a half duplex communication between the main apparatus and the data carrier.

19. The signal transmission method according to claim 18 wherein said initial response data includes an identification code of said data carrier.

* * * * *